United States Patent Office 3,455,991
Patented July 15, 1969

3,455,991
METHYL 2-METHYLENE-CYCLOUNDECANE-CARBOXYLATE
Yannik Bonnet, Tassin-la-Demi-Lune, Rhone, France, assignor to Rhone-Poulenc S.A., Paris, France, a French body corporate
No Drawing. Filed Jan. 17, 1966, Ser. No. 520,887
Claims priority, application France, Jan. 27, 1965, 3,485, Patent 1,437,448
Int. Cl. C07c 69/74
U.S. Cl. 260—468                                    1 Claim

ABSTRACT OF THE DISCLOSURE

This invention is directed to a new chemical compound, methyl 2-methylene-cycloundecane carboxylate, useful as a perfume.

---

This invention relates to cycloalkane-carboxylic acid derivatives and their preparation.

The invention provides the new 2-methylene-cycloalkane-craboxylic acids, esters and amides of the formula:

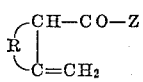

where R is an optionally substituted polymethylene radical of formula: —$(CH_2)_n$—, wherein $n$ is 3 to 15, Z is —$OR^1$ or —$OR^2R^3$, wherein $R^1$ is hydrogen or alkyl of 1 to 4 carbon atoms and $R^2$ and $R^3$, which are the same or different, represent alkyl, alkenyl, cycloalkyl, cycloalkylalkyl, aryl or aralkyl radicals, and $R^2$ may also represent hydrogen, or $R^2$ and $R^3$ are linked together to form a saturated or unsaturated divalent organic radical, optionally containing one or more hetero atom, such as O, S or N.

The group —$NR^2R^3$ may be such that the compound $HNR^2R^3$ is, for example, a saturated aliphatic amine such as a mono or dialkyl-amine whose alkyl groups may be, for example, methyl, ethyl, n-propyl, isopropyl, n-butyl, secondary butyl, pentyl or hexyl, or an unsaturated aliphatic amine such as, for example, allylamine; and alicyclic amine such as cyclopentylamine, cyclohexylamine, cyclooctylamine, cyclodecylamine, cyclododecylamine or a corresponding amine whose ring is substituted by one or more alkyl, e.g. methyl, ethyl, propyl or butyl groups; an aromatic amine such as aniline, monomethylaniline, a toluidine, a xylidine or diphenylamine; an amine comprising a cycloalkylalkyl or aralkyl radical such as 2-cyclohexylethylamine, benzylamine or 2-phenylethylamine; a mononuclear heterocyclic amine comprising 5 or 6 ring atoms, which may include a second heteroatom, such as pyrrolidine, piperidine, piperazine, a 4-alkylpiperazine, or morpholine; a polynuclear heterocyclic amine such as a hydroquinoline, phenthiazine or a similar compound.

Especially valuable compounds of Formula I are those in which R is —$(CH_2)_n$—, where $n$ is 3 to 9, and Z is —$OR^1$, where $R^1$ is hydrogen or alkyl of 1 to 4 carbon atoms, or —$NR^2R^3$ where $R^2$ is hydrogen or alkyl of 1 to 4 carbon atoms, $R^3$ is alkyl of 1 to 4 carbon atoms, or $R^2$ and $R^3$ together with the adjacent nitrogen represent pyrrolidino, piperidino, morpholino, piperazino or 4-alkylpiperazino, in which the alkyl group is of 1 to 4 carbon atoms.

The compounds of Formula I are intermediates useful in organic synthesis, and some of them have applications in therapeutics or in perfumery.

The invention includes within its scope a process for the preparation of the compounds of Formula I which comprises (1) halogenating an aminomethyl-cycloalkanone of formula:

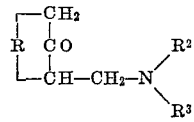

R, $R^2$ and $R^3$ being as hereinbefore defined so as to produce a halo-compound of formula:

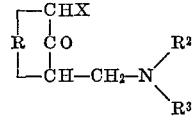

where X is halogen, e.g. chlorine or bromine, and then (2) reacting the said halo-compound with a mineral alkaline substance in an alcohol of formula R'—OH (where R' is alkyl of 1 to 4 carbon atoms) so as to produce a mixture of compounds of Formula I in which Z is OR' and —$NR^2R^3$.

It is known that when a compound containing an N-substituted-aminomethyl substituent is heated in the presence of an alkaline agent, decomposition occurs which gives rise to a compound containing a methylene group with the liberation of a secondary amine in accordance with the equation:

$$>CH\text{---}CH_2N< \rightarrow >C=CH_2 + HN<$$

It is also known that, by the action of an alkaline agent, α-mono-halogenated-cycloalkanones are converted, in accordance with Faworsky's reaction, into cycloalkane-carboxylic acids having in their nucleus one carbon atom less than the treated ketone, the hydracid corresponding to the halogen being liberated.

It has now been found that, by reacting one molecule of a compound of the Formula II with one molecule of a halogen, or an equivalent quantity of another halogenating agent, an N-substituted-α'-monohalogeno-α-aminomethylcycloalkanone of the Formula III is obtained, and that when this compound is subjected to the action of an alkaline agent in an alcoholic medium, a mixture of ester and amide of Formula I is obtained in which the ring contains one carbon atom less than the ring of the starting material of Formula II. The treatment of compounds of Formula III with alkaline agents in alcohol is novel and the result obtained not obvious, having regard to the influence of the substituents carried by the carbon atoms in the α-position of the ketonic function on the course of Faworsky's reaction.

The process of the invention is generally carried out as follows:

The N-substituted-2-aminomethyl-cycloalkanone (which is preferably used as its hydrohalide) is treated with a halogenating agent, preferably a molecular halogen such as chlorine or bromine. In order to obtain the monohalogenated derivative, one molecule of the 2-aminoethyl-cycloalkanone hydrobromide or hydrochloride is reacted with at most one molecule of a halogen which is slowly added as a solution in an organic solvent, such as benzene, carbon tetrachloride or acetic acid. The slow addition of one molecule of bromine, for example in solution in acetic acid, to one molecule of 2-aminomethyl-cycloalkanone hydrohalide, also in solution in acetic acid, at ambient temperature and with stirring gives in quantitative yield the desired α-aminomethyl-α'-monobromocycloalkanone, in the form of the hydrohalide.

This monohalogenated derivative, optionally after liberation from its hydrohalide, is then treated with an alkaline mineral agent in a solvent medium with heating at the reflux temperature. The alkaline agent may be, for example, an alkali metal, more particularly sodium or potassium, or a derivative thereof such as a carbonate, bicarbonate or alcoholate with a primary alcohol, more particularly a methoxide, ethoxide or benzyloxide. As reaction medium, there is preferably employed an alkanol of 1 to 4 carbon atoms such as methanol or ethanol. The quantity of alkaline agent used ordinarily corresponds to 0.5 to 4 atoms of sodium, preferably to 2 to 3 atoms, per mol. of monohalogenated derivative. It is used in dilute solution or suspension in the alcohol chosen as reaction medium. The reaction lasts several hours. When the monohalogenated derivative has completely reacted, the mixture obtained is treated to separate the ester and the amide formed, or it is saponified directly to the acid only. The extraction of these various products is effected by application of the usual methods of separating similar compounds.

The acids of Formula I (Z=—OH) may be esterified to give such esters as are desired. It is sometimes more advantageous to adopt this procedure rather than attempt to isolate the ester directly.

The 2-aminomethyl-cycloalkanones of Formula II may be prepared by the Mannich reaction, by simultaneous action of formaldehyde and of an aliphatic, cycloaliphatic, aromatic or heterocyclic primary or secondary amine of formula $HNR^2R^3$ on a cyclic ketone of formula:

IV

Some of these 2-aminomethyl-cycloalkanones are known.

The 2-aminomethyl1cycloalkanones prepared from the $C_8$ and $C_{12}$ cyclic ketones are particularly suitable. The ketones employed in their preparation are readily obtained by oxidation of the corresponding cyclic hydrocarbons. Thus, from 2-dimethylaminomethyl-cyclododecanone, 2-methylene-cycloundecane-carboxylic acid, which is a solid crystalline product melting at 60° C., methyl 2-methylene-cycloundecane-carboxylate, which is a colourless liquid product, B.P. 100–101° C./0.1 mm. Hg, $n_D^{25}=1.486$, and 1 - N,N-dimethylcarbamoyl-2-methylene-cycloundecane, which is a colourless oily product, B.P. 121–121.5° C.,/0.1 mm. Hg, $n_D^{25}=1.5059$, have been prepared.

From 2-piperidyl-methyl-cyclododecanone, the aforesaid 2-methylene-cycloundecane-carboxylic acid, and 1-N-pentamethylene-carbamoyl - 2 - methylene-cycloundecane, which is a crystalline solid product, M.P. 33–35° C., have been prepared.

These compounds may be used as intermediates in organic synthesis. In addition methyl 2-methylene- cycloundecane-carboxylate has a pleasant odour, and is useful in perfumery, as it imparts to compositions containing it a delicate and balanced woody, camphor like and minty scent.

The following examples illustrate the invention:

EXAMPLE 1

(1) Preparation of 12-bromo-2-dimethylaminomethyl-cyclododecanone

Into a 500-cc. three-necked, round-bottomed flask provided with a reflux condenser, a dropping funnel and a stirring system, 17.8 g. (0.074 mol.) of 2-dimethylaminomethyl-cyclododecanone, 130 g. of glacial acetic acid and 40 g. of acetic anhydride are introduced.

12.7 g. of a 48% aqueous hydrobromic acid solution are then added with stirring in ten minutes. At the end of the addition, the temperature in the mixture reaches 60° C. It is then raised to boiling point and 12.8 g. of bromine in solution in 25 cc. of glacial acetic acid are added in fifteen minutes and the boiling is then maintained for 30 minutes. The acetic acid is removed by distillation in vacuo, and the solid residue obtained is finely ground and then taken up in 60 cc. of diethyl ether. After filtration, the solid product is dried in an oven in vacuo and 29.5 g. of crystals of pale beige colour are obtained, M.P. 133–134° C., identified by nuclear magnetic resonance as 12-bromo-2-dimethylaminomethyl-cyclododecanone hydrobromide. The yield is 99%.

From the hydrobromide thus obtained, the amine is liberated as follows. 25.5 g. of the hydrobromide, 135 cc. of diethyl ether, and 135 cc. of water are introduced into an apparatus identical with that previously described, and 7.7 cc. of an aqueous 10 ammonia solution are added with stirring at normal temperature. Stirring is continued until the hydrobromide has completely dissolved. The ethereal layer is separated, washed to neutrality with water and then dried over anhydrous sodium sulphate, and the solvent is driven off. 16.8 g. of a white crystalline product, M.P. 65–69° C., are thus collected which, after recrystallisation from a mixture of diethyl ether and pentane (10:90% by volume), has a melting point of 73–73.5° C., and is identified by nuclear magnetic resonance as 12-bromo-2-dimethylaminomethyl-cyclododecanone.

2-dimethylaminomethyl-cyclododecanone was prepared by the reaction of cyclododecanone with dimethylamine hydrochloride and trioxymethylene, by the process described in Belgian Patent No. 601,671.

(2) Preparation of methyl 2-methylene-cycloundecane-carboxylate

Into a 1000-cc. three necked, round-bottomed flask provided with a reflux condenser and a stirring system, 63.6 g. of 12-bromo-2-dimethylaminomethyl-cyclododecanone, 34 g. of sodium bicarbonate and 600 cc. of methanol are introduced. Stirring is started and the mixture is raised to the boiling point and maintained at this temperature for 20 hours. By distillation, followed by evaporation under the vacuum of a water jet pump, the methanol is removed and the residue is then taken up in 200 cc. of diethyl ether and 100 cc. of water. To the separated ethereal layer 100 cc. of a 10% aqueous hydrochloric acid solution are added and the ethereal solution is then washed to neutrality with water and dried over anhydrous sodium sulphate. On evaporation of the ether, 37 g. of a yellow oil are obtained, which is saponified with 40 g. of caustic potash in 400 cc. of methanol with heating under reflux for 6 hours with stirring. The methanol is driven off in a vacuum and 200 cc. of water are then added. The organic layer is extracted with 200 cc. of diethyl ether and separated. The ethereal layer is then washed to neutrality with water and dried over sodium sulphate. After elimination of the ether, 20.4 g. of an oily product are collected which, on distillation in vacuo, gives 16.8 g. of a colourless product, B.P. 121–121.5° C./0.1 mm. Hg, $n_D^{25}=1.5059$, identified as 1-dimethylcarbamoyl-2-methylenecycloundecane.

The aqueous layer of the saponified reaction mass, which has been separated from the organic layer, is combined with the washing liquors of the ethereal extract of this layer. The mixture is acidified to a pH of 1 by adding 270 cc. of a 10% aqueous hydrochloric acid solution. The solution is then extracted with 100 cc. of diethyl ether, and the ethereal layer is washed to neutrality with water and dried over anhydrous sodium sulphate. By evaporation of the ether, 15.3 g. of a solid product are isolated, M.P. 50–53° C., which, after recrystallisation from a mixture of diethyl ether and pentane (50:50 by volume), has a melting point of 60° C. This product, which is identified by nuclear magnetic resonance, is 2-methylene-cycloundecane-carboxylic acid. Esterification of this acid with methanol gives methyl 2-methylene-cycloundecane-carboxylate, which is a colourless product, B.P. 100–101° C./0.1 mm. Hg, $n_D^{25}=1.486$, having a pleasant woody odour.

EXAMPLE 2

The preparation of 12-bromo-2-dimethylaminomethyl-cyclododecanone is carried out as in Example 1 but the sodium bicarbonate treatment is replaced by a treatment with 10 g. of metallic sodium in methanol (600 cc.) the operating conditions remaining the same and 37 g. of a yellow oil are obtained which contain methyl methylene-cycloundecane carboxylate and 2-dimethylcarbamoyl-1-methylene-cycloundecane. By treating this mixture as in Example 1, 1-dimethyl-carbamoyl-2-methylene-cycloundecane and 2-methylene-cycloundecane-carboxylic acid are obtained.

EXAMPLE 3

By proceeding as in Example 1, starting with 2-piperidyl-methyl-cyclododecanone, 12 - bromo-2-(2-piperidyl-methyl)-cyclododecanone is obtained as a white crystalline product having a melting point of 93.5–94° C., identified by nuclear magnetic resonance.

After crystallisation and treatment as described in Example 1, this compound gives 2-methylene-cycloundecane-carboxylic acid in a yield of 47.8% and 1-N-pentamethylene-carbamoyl-2-methylene-cycloundecane, which is a colourless crystalline compound having a melting point of 33–35° C., $n_D^{25}$=1.5185, B.P. 148–152° C./0.1 mm. Hg in a yield of 32.8%.

EXAMPLE 4

By proceeding as in Example 1, by the action of bromine and hydrobromic acid on 2-dimethylaminomethyl-cyclooctanone (52.4 g.) 8-bromo-2-dimethylaminomethyl-cyclooctanone hydrobromide is prepared which is subjected to the action of sodium bicarbonate in methanol in the same way.

32.1 g. of an orange-coloured oil are thus obtained containing (as determined by nitrogen content) 13.5% of an amide identified by infra-red spectrography as 1-dimethylcarbamoyl-2-methylene-cycloheptane. The whole of this oil is saponified and then treated as in Example 1. Extraction with diethyl ether, followed by acidification of the aqueous layer, gives 28.6 g. of an oily acid fraction, from which 26.2 g. of an oily product distilling at 94–97° C. under 0.1 mm. Hg are separated by fractional distillation. This is identified by nuclear magnetic resonance as 2-methylene-cycloheptane-carboxylic acid.

I claim:
1. Methyl 2-methylene-cycloundecane-carboxylate.

References Cited
UNITED STATES PATENTS
2,850,523   9/1958   Dazzi _____ 260—468

NORMA S. MILESTONE, Primary Examiner

R. T. BOND, Assistant Examiner

U.S. Cl. X.R.

252—522; 260—243, 247.7, 268, 289, 294.7, 326.5, 514, 557, 563